No. 722,545. PATENTED MAR. 10, 1903.
F. H. VAN HOUTEN.
DOUGH DIVIDING MACHINE.
APPLICATION FILED JULY 7, 1902.
NO MODEL. 4 SHEETS—SHEET 2.
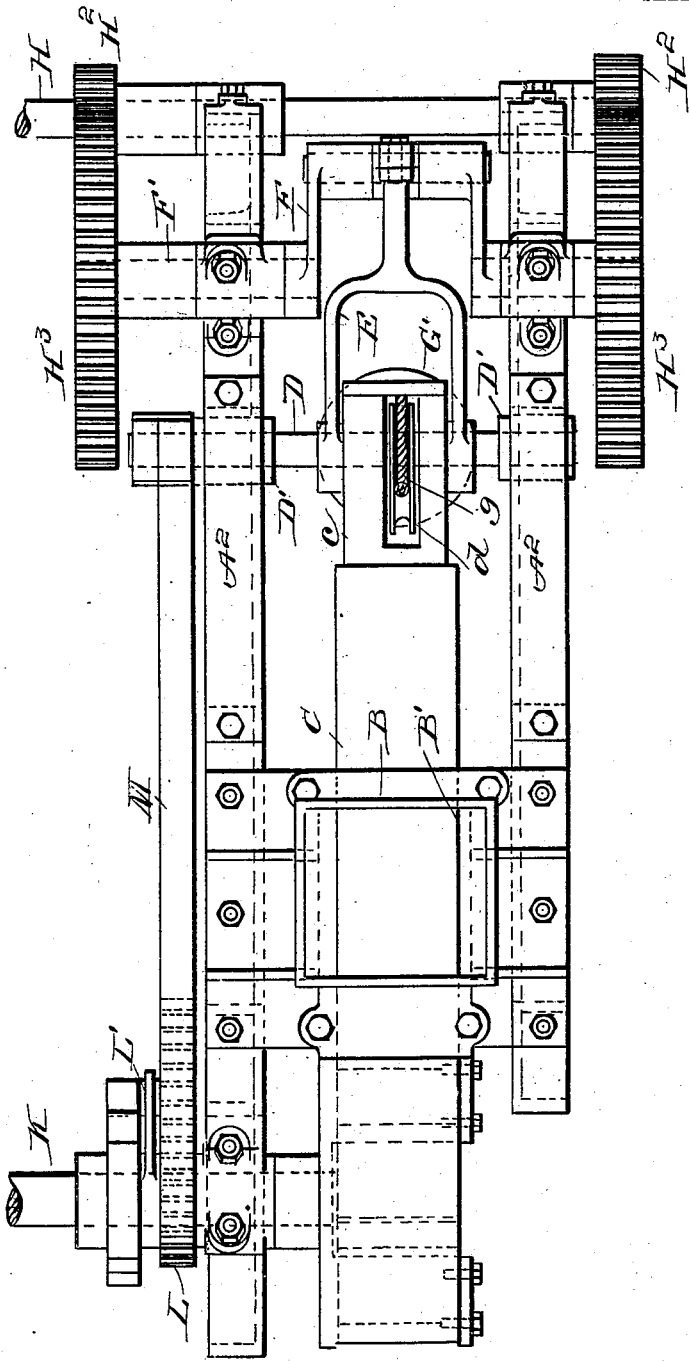
Witnesses
J. M. Fowler Jr.
Thomas Durant
Inventor:
Frank H. Van Houten,
by Church & Church,
his Attys

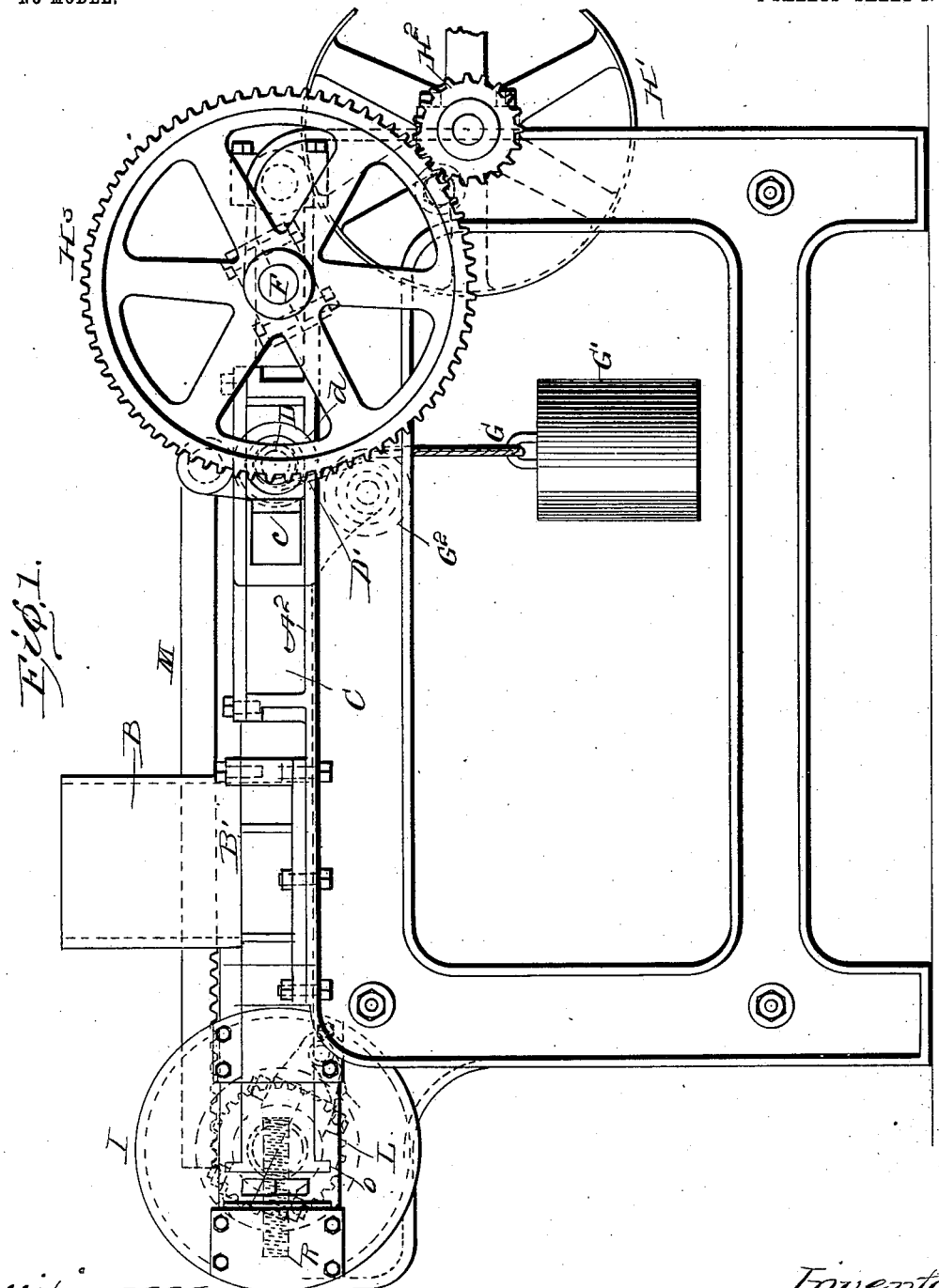

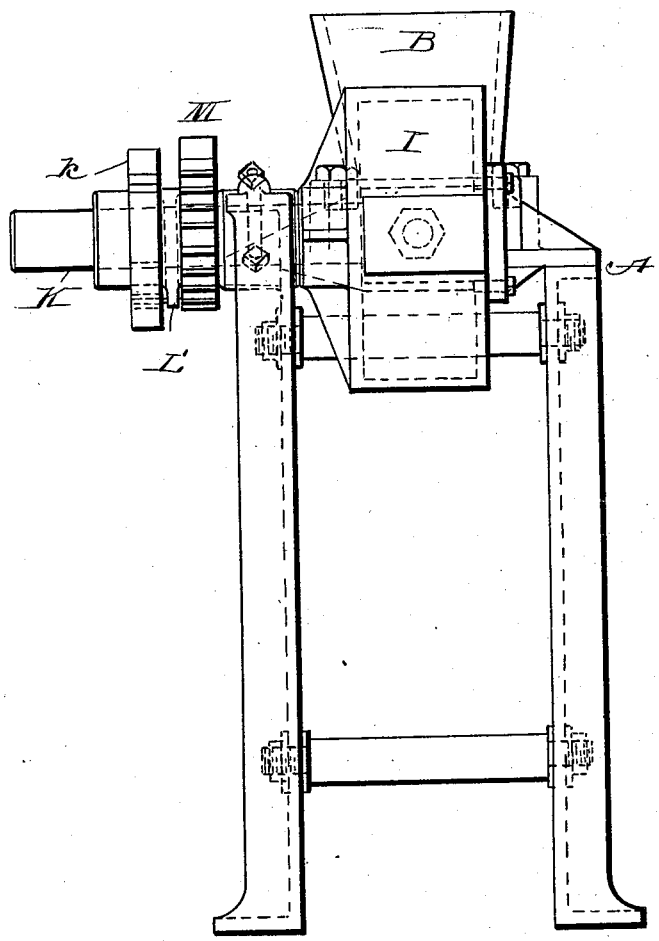

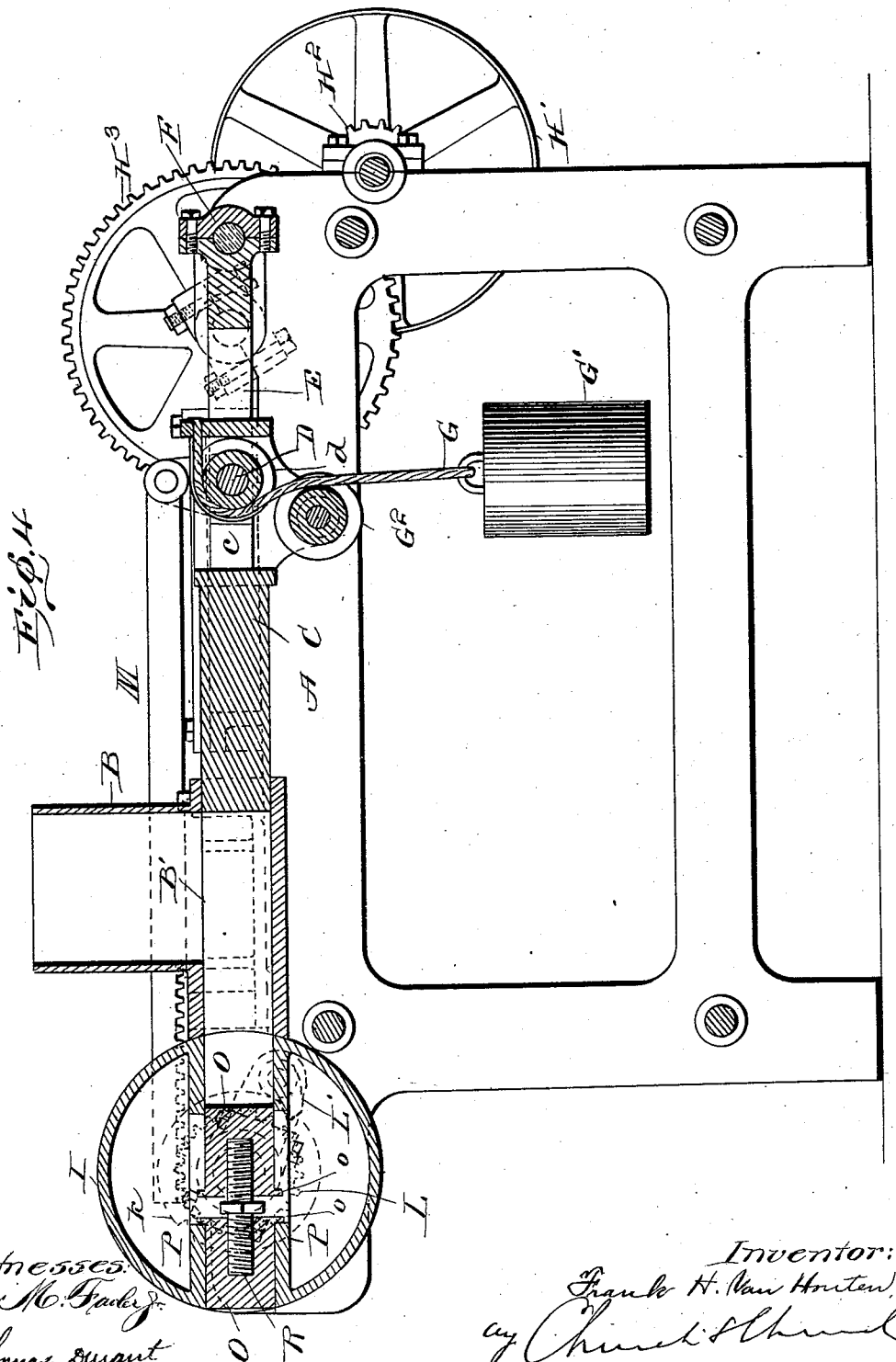

UNITED STATES PATENT OFFICE.

FRANK H. VAN HOUTEN, OF FISHKILL-ON-THE-HUDSON, NEW YORK.

DOUGH-DIVIDING MACHINE.

SPECIFICATION forming part of Letters Patent No. 722,545, dated March 10, 1903.

Application filed July 7, 1902. Serial No. 114,583. (No model.)

*To all whom it may concern:*

Be it known that I, FRANK H. VAN HOUTEN, of Fishkill-on-the-Hudson, in the county of Dutchess, State of New York, have invented certain new and useful Improvements in Dough-Dividing Machines; and I do hereby declare the following to be a full, clear, and exact description of the same, reference being had to the accompanying drawings, forming a part of this specification, and to the letters of reference marked thereon.

This invention relates to improvements in machines for handling breadstuff, and particularly to machines designed for dividing or subdividing mixed and plastic dough into parts of a predetermined size, density, and weight, thereby materially facilitating the separation of the batch into parts each of which is of a proper size and weight to constitute a loaf having a weight corresponding to other loaves from the same batch. Difficulty has been experienced in producing a machine for performing this work; and it is the object of the present invention to provide a simple and highly-efficient apparatus well adapted for subdividing batches of dough of differing consistency, and which apparatus shall require a minimum power for operating the same.

The invention consists in certain novel details of construction and combinations and arrangements of parts, all as will be now described, and pointed out particularly in the appended claims.

Referring to the accompanying drawings, Figure 1 is a side elevation of a machine embodying the present improvements. Fig. 2 is a top plan view of the same. Fig. 3 is an end elevation; and Fig. 4 is a longitudinal vertical section taken centrally of the hopper, plunger, and measuring-head.

Like letters of reference in the several figures indicate the same parts.

The body of the machine preferably consists of a main frame formed by side pieces A, connected by suitable cross-braces and adapted to support near the top a hopper B. A channel extending through the bottom of the hopper constitutes a discharge aperture or nozzle B' at one side, and a plunger C, working in said channel and adapted to travel across the bottom of the hopper from side to side, forces the dough out through the discharge-opening. In front of the discharge-opening and in position to receive the dough therefrom is a measuring-head, having suitable pockets or compartments adapted to be brought successively in front of the discharge-opening, as will be presently explained.

The plunger C, before referred to, is supported at one end by the hopper-base and at the opposite end is provided with guides or ways $c$, working on a cross-head formed by a shaft D, mounted in sliding bearings D', adapted to travel in suitable ways $A^2$, formed in the sides A of the main frame. The cross-head D is connected by a bifurcated pitman or connecting-rod E with a crank F of a crank-shaft F', whereby by the rotation of said crank-shaft the pitman and cross-head will be oscillated and such oscillations will be imparted to the plunger C. The cross-head and plunger, however, are capable of an independent movement, whereby the movement of the plunger may be retarded or arrested without arresting the movement of the crank-shaft and without reducing the pressure exerted by said plunger on the dough. In the preferred form of connection between the cross-head and plunger the cross-head is provided with a grooved pulley $d$, over which pulley a flexible connection G is passed, the upper end of said connection being secured to the plunger-frame, while the opposite end of said connection carries a weight G'. Thus if on the forward movement of the cross-head the movement of the plunger be arrested the said cross-head may continue its movement, such continued movement operating to elevate the weight G', and at the same time said weight G' maintains a constant and uniform pressure on the plunger until the cross-head again returns to the rear extreme of its independent movement and the weight has again reached its lowermost position. To avoid the necessity of employing an extremely heavy weight or to augment the power of the weight in holding the plunger and cross-head against independent movement, a second pulley $G^2$ is journaled on a downward extension of the plunger-frame, and the flexible connection G passes first over one side of the pulley $G^2$ and then over the opposite side of the pulley $d$, whereby in accordance with the well-known principles governing block-and-tackle connections the power of the weight and the resistance to the independent movement of the cross-head and plunger is doubled.

The crank-shaft F' preferably derives its motion from a drive-shaft H, also journaled on the main frame and receiving its power through belting applied to the pulley H', the connection between the drive-shaft H and crank-shaft being preferably formed by gears $H^2$ and $H^3$, located at opposite ends of the crank-shaft, as shown.

The measuring-head before referred to is indicated by the letter I and is preferably mounted on the shaft K, supported in a bearing at one side of the main frame and provided with a means whereby the said shaft and head may be intermittently rotated to bring successive compartments into alinement with the upper channel, such mechanism being, preferably, as follows: The shaft K is provided with a disk or wheel $k$, having a number of teeth or notches corresponding to the number of compartments in the measuring-head, while journaled on said shaft is a gear-wheel L, having a pawl-carrying arm and pawl L', adapted to coöperate with the teeth or notches in the disk or wheel $k$. Oscillation is imparted to the gear-wheel L by a rack-bar M, pivotally connected with one end of the cross-head D. Thus as said cross-head is reciprocated a corresponding movement is imparted to the rack-bar, the wheel L is oscillated, and on the movement of the wheel L in one direction the pawl L' engages one of the teeth in the wheel $k$, thereby rotating the measuring-head a sufficient distance to bring a new compartment into alinement with the hopper-channel. The measuring-head preferably contains but two compartments, said compartments being located at diametrically opposite points and in alinement with each other. Each compartment is provided with a plunger O, the outward movements of the plungers being limited by shoulders or projections $o$ on the inner ends of the plungers contacting with projections or the end walls P of the compartment. Said plungers are connected together, preferably, by an adjustable connection formed by a stem R, having right and left hand threads thereon with a central controlling-head, whereby said plungers are caused to operate in unison, but in opposite directions, and thus when one compartment is being filled and its plunger forced inward by the entering material the opposite plunger will be moved in the opposite direction and the material in its compartment thereby discharged. By varying the distance between the plungers the size of the compartments may be varied correspondingly, and by forming the compartments in the peripheral face of a cylindrical measuring-head the edges of the compartments constitute cutters for severing the dough when the head is rotated, and the cylindrical surfaces between the compartments serve to prevent the escape of the dough from the hopper-channel during the time the rotary head is in motion, although during a large part of such time there is little or no pressure on the dough in the hopper-channel. During the initial movement of the head, however, it is desirable that the pressure should be maintained on the dough, this effect being secured by the action of the weight G', as will be understood from the following description of the operation of the machine.

Kneaded dough is placed in the hopper B and passes by gravity through the bottom of such hopper and into the horizontally-extending hopper-channel in front of the plunger C. When the crank-shaft is set in motion, assuming that the parts are in the position indicated in Fig. 4, the plunger will be advanced in unison with the cross-head until the dough in front of the plunger is forced through the hopper-channel and into the measuring-compartment located in line therewith. When the dough has been compressed in said compartment to a degree determined by the weight G', the forward movement of the plunger C will be arrested and the cross-head will continue its movement by elevating the weight G'. On the return movement of the cross-head effected by the continued rotation of the crank-shaft the rack-bar-and-pawl connection with the measuring-head will become effective and impart a half-rotation to the measuring-head. During the initial portion of such movement the pressure on the dough in the compartment will be maintained, or until the compartment has rotated away from the hopper-channel, thereby holding the dough firmly in position while being severed between the measuring-head and nozzle of the hopper-channel; but during the final movement of the cross-head the plunger will be picked up by the cross-head and carried to the rearward extreme of its movement, permitting the dough in the hopper to drop down in front of the plunger ready to be forced forward into the next measuring-compartment, which has now been brought into alinement with the nozzle of the hopper-channel. In the next operation of the machine the parts function as before described; but in addition the plunger of the compartment which is not in line with the hopper-channel is forced inwardly, and by such movement the plunger of the compartment previously filled is forced outwardly and the dough contained in that compartment is thereby discharged.

Having thus described my invention, what I claim as new, and desire to secure by Letters Patent, is—

1. In a dough-dividing machine, the combination with a hopper, a hopper-channel for receiving dough from said hopper and discharging the same, and a measuring-head having measuring-compartments adapted to aline with said channel, of a plunger working in said channel for discharging the dough into said compartments, a cross-head, a crankshaft for reciprocating said cross-head and a yielding connection between said cross-head and plunger; substantially as described.

2. In a dough-dividing machine, the combination with a hopper, a hopper-channel for receiving dough therefrom and discharging the same and a head having a measuring-compartment adapted to aline with said channel, of a plunger working in said channel for discharging the dough into the measuring-compartment, a reciprocatory cross-head coöperating with the plunger to move it positively in one direction, a yielding connection between the plunger and cross-head, whereby the movement of the plunger in the opposite direction may be arrested and a driving mechanism for reciprocating the cross-head; substantially as described.

3. In a dough-dividing machine, the combination with a hopper, a hopper-channel adapted to receive dough from said hopper and to discharge the same and a measuring-head having a measuring-compartment adapted to aline with said channel, of a plunger for discharging the dough through said channel into the measuring-compartment, a reciprocatory cross-head, a weight and a flexible connection from which said weight is suspended forming the connection between said cross-head and plunger, whereby the movement of the plunger in one direction may be arrested without arresting the movement of the cross-head, and means for reciprocating said cross-head; substantially as described.

4. In a dough-divider, the combination with a hopper, hopper-channel for receiving dough therefrom and discharging the same, a measuring-compartment adapted to aline with said channel and a reciprocatory plunger for discharging the dough from said channel into the compartment, of a reciprocatory cross-head, a pulley on said cross-head, a flexible connection connected at one end with the plunger passing over said pulley and supporting a weight at the opposite end and means for reciprocating the cross-head; substantially as described.

5. In a dough-divider the combination with a hopper, hopper-channel for receiving dough therefrom and discharging the same, a measuring-compartment adapted to aline with said channel and a reciprocatory plunger for discharging the dough into said compartment, said plunger having guides thereon, of a reciprocatory cross-head working in said guides, a pulley on said cross-head, a flexible connection passing around said pulley and connected at one end with the plunger, a weight supported by the opposite end of said flexible connection, and means for reciprocating the cross-head, whereby the movement of the cross-head may continue when the movement of the plunger is arrested; substantially as described.

6. In a dough-divider, the combination with the hopper, hopper-channel for receiving dough therefrom and discharging the same, measuring-compartment adapted to aline with said channel and a reciprocatory plunger for discharging the dough into said compartment, of a reciprocatory cross-head, a pulley on said cross-head, a second pulley on the plunger, a flexible connection secured at one end to the plunger and passing around opposite sides of said pulley, a weight for maintaining the tension of said flexible connection and means for reciprocating the cross-head; substantially as described.

7. In a dough-divider, the combination with the hopper, hopper-channel for receiving dough therefrom and discharging the same, a rotary measuring-head having measuring-compartments adapted to aline with said channel, and a reciprocatory plunger for discharging dough into said compartments, of a reciprocatory cross-head for operating said plunger, a yielding connection interposed between said cross-head and plunger and intermittently operating driving mechanism intermediate the cross-head and rotary measuring-head whereby during the forward stroke of the cross-head the plunger is operated to discharge dough into a measuring-compartment and during the retrograde movement of the cross-head the rotary head is moved to bring a new compartment into alinement with the hopper-channel; substantially as described.

8. In a dough-divider, the combination with the hopper, hopper-channel for receiving dough therefrom and discharging the same, the rotary measuring-head having the measuring-compartments adapted to aline with said channel, reciprocatory plunger for discharging the dough into said compartments, reciprocatory cross-head and a yielding connection between said cross-head and plunger, of a rack-bar operated by said cross-head, toothed wheel with which said rack-bar meshes, and a pawl-and-ratchet connection intermediate said toothed wheel and rotary measuring-head whereby upon the movement of the cross-head in one direction, the plunger is advanced to fill a compartment, and upon the movement of the cross-head in the opposite direction the rotary head is moved to bring a new compartment into alinement with the channel; substantially as described.

9. In a dough-divider, the combination with a hopper, hopper-channel and means for periodically discharging dough from said channel, of a rotary measuring-head having compartments adapted to aline with said channel for receiving the dough therefrom, plungers working in said compartments, projections for limiting the outward movement of said plungers and an adjustable connection between said plungers whereby their inward movement may be varied and limited; substantially as described.

10. In a dough-divider, the combination with the hopper, hopper-channel for receiving dough therefrom and discharging the same, a measuring-head having a measuring-compartment adapted to aline with said channel and a reciprocatory plunger for discharging the dough into said compartment, of a cross-head, a weighted block-and-tackle connection between the said cross-head and plunger whereby the movement of the plunger may be arrested without arresting the movement of the cross-head and without varying the pressure on the plunger during the time its motion is arrested, a driving-shaft and connections between said driving-shaft and cross-head for reciprocating the latter; substantially as described.

11. In a dough-dividing machine, the combination with the hopper, hopper-channel measuring-head, plunger for discharging the dough into said measuring-head, a cross-head and yielding connections between the cross-head and plunger, of a crank-shaft and a bifurcated pitman connecting said crank-shaft and cross-head, the arms of said pitman extending on opposite sides of the plunger; substantially as described.

FRANK H. VAN HOUTEN.

Witnesses:
J. E. VAN HOUTEN,
ALICE M. KEANE.